(12) United States Patent
Herz et al.

(10) Patent No.: US 6,965,956 B1
(45) Date of Patent: Nov. 15, 2005

(54) DISK ARRAY CONTROLLER AND SYSTEM WITH AUTOMATED DETECTION AND CONTROL OF BOTH ATA AND SCSI DISK DRIVES

(75) Inventors: John Peter Herz, Menlo Park, CA (US); Christophe Therene, Livermore, CA (US); Ronald J. Schoenbaum, Newport Coast, CA (US)

(73) Assignee: 3ware, Inc., Sunnyvale, CA (US)

( * ) Notice: Subject to any disclaimer, the term of this patent is extended or adjusted under 35 U.S.C. 154(b) by 319 days.

(21) Appl. No.: 10/378,028

(22) Filed: Feb. 28, 2003

(51) Int. Cl.[7] .................. G06F 13/00; G06F 13/12; G06F 13/38; G06F 13/42; G06F 12/00
(52) U.S. Cl. .................. 710/74; 710/8; 710/11; 710/14; 710/15; 710/16; 710/62; 710/63; 710/64; 710/72; 710/73; 710/74; 710/104; 710/105; 710/302; 711/100; 711/111; 711/112; 711/114
(58) Field of Search ................. 710/5, 8, 10, 11, 710/14–16, 38, 62–64, 72–74, 104, 105, 710/301, 302, 305; 711/100, 111, 112, 114, 711/149

(56) References Cited

U.S. PATENT DOCUMENTS

| | | | | |
|---|---|---|---|---|
| 5,922,062 | A * | 7/1999 | Evoy .................. | 710/305 |
| 6,098,114 | A | 8/2000 | McDonald et al. | |
| 6,115,771 | A | 9/2000 | Born | |
| 6,480,924 | B1 | 11/2002 | Bengtsson et al. | |
| 6,598,095 | B2 * | 7/2003 | Peterson .................. | 710/8 |
| 6,795,895 | B2 * | 9/2004 | Merkey et al. ............. | 711/114 |
| 2002/0194405 | A1 | 12/2002 | Huang | |
| 2003/0212859 | A1 * | 11/2003 | Ellis et al. ................ | 711/114 |
| 2004/0010660 | A1 * | 1/2004 | Konshak et al. ........... | 711/114 |
| 2004/0088455 | A1 * | 5/2004 | Smith et al. .................. | 710/72 |
| 2004/0117522 | A1 * | 6/2004 | Loffink et al. ................ | 710/74 |
| 2004/0230817 | A1 * | 11/2004 | Ma ............................ | 713/193 |
| 2004/0243386 | A1 * | 12/2004 | Stolowitz et al. ............. | 703/25 |

OTHER PUBLICATIONS

Press Release titled *"Industry Leaders Collaborate on New Choices for Next-Generation Serial Architectures for Server Storage,"* dated Jun. 10, 2002, printed from Serial Attached SCSI.com Web Site.

Press Release titled *"SCSI Trade Association and Serial Attached SCSI Working Group Announce Agreement,"* dated Feb. 4, 2002, printed from Serial Attached SCSI.com Web Site.

Press Release titled *"Industry Leaders Team to Form Serial Attached SCSI Working Group to Address Next-Generation Interconnect Needs,"* dated Nov. 26, 2001, printed from Serial Attached SCSI.com Web Site.

"Disk Interface Technology, Quick Reference Guide," Intel Corporation (2002).

(Continued)

*Primary Examiner*—Jeffrey Gaffin
*Assistant Examiner*—Tanh Q Nguyen
(74) *Attorney, Agent, or Firm*—Knobbe, Martens, Olson & Bear LLP

(57) ABSTRACT

A disk array controller detects whether each drive it is connected to is an ATA drive or a SCSI drive, and communicates with that disk drive using the corresponding protocol. Preferably, the disk array controller supports both the Serial ATA interface specification and the Serial Attached SCSI interface specification, allowing either or both types of disk drives to be included within a RAID or other disk array configuration. The disk array controller may be incorporated into a storage server having hot swap drive carriers that accommodate both types of disk drives.

21 Claims, 2 Drawing Sheets

OTHER PUBLICATIONS

"*FAQ on Parallel and Serial Attached SCSI*," Serial Attached SCSI FAQ 4-page document, printed on Jan. 29, 2003 from scsita.org web site.

White Paper titled *"Serial Attached SCSI and Serial ATA Compatibility—Enabling the Coexistence of Serial Attached SCSI and Serial ATA Drives in a Single Storage System,"* Authored by Intel Corporation on behalf of , SCSI Trade Association 2002, (8 pages).

\* cited by examiner

DISK ARRAY CONTROLLER AND SYSTEM WITH AUTOMATED DETECTION AND CONTROL OF BOTH ATA AND SCSI DISK DRIVES

FIELD OF THE INVENTION

The present invention relates to data storage systems, and more particularly, relates to disk array systems.

BACKGROUND OF THE INVENTION

Two competing disk drive interface standards currently exist within the storage industry: the ATA (Advanced Technology Attachment) standard and the SCSI (Small Computer System Interface) standard. These standards define both the physical interface and the protocol used to communicate with a disk drive. Both standards have evolved over time through the release of new ATA and SCSI specifications. For example, advancements in disk interface technology have recently led to the development of the Serial ATA specification and the Serial Attached SCSI specification, both of which use a common physical and electrical interface.

Because neither the ATA standard nor the SCSI standard has clearly prevailed over the other, the storage industry continues to expend significant resources supporting both standards. For example, a storage integrator wishing to manufacture and sell a disk array system generally must design the system to support either ATA disk drives or SCSI disk drives. If the storage integrator wishes to also provide a disk array solution that supports the other standard (to cater to customer loyalties to a particular standard), it generally must maintain and support a separate product line that uses a different disk array controller and other hardware components.

The present invention seeks to address this and other problems.

SUMMARY OF THE INVENTION

The present invention provides a disk array controller that is capable of detecting and controlling both ATA and SCSI disk drives. The disk array controller preferably supports both the Serial ATA ("SATA") specification and the Serial Attached SCSI ("SAS") specification, and is capable of controlling an array of SATA disk drives, an array of SAS disk drives, or a mixed array of both SATA and SAS disk drives. The disk array controller may be incorporated into a storage server that supports both types of disk drives.

In one embodiment, the disk array controller communicates with each disk drive to determine the drive's type (SATA or SAS). The type of each disk drive may alternatively be determined based upon an attribute of the corresponding hot-swap drive carrier, such as the position of a physical drive type indicator switch. Once the type of a given disk drive has been determined, the disk array controller uses a corresponding protocol (ATA or SCSI) to communicate with that disk drive. The disk array controller may also appropriately conform to the features, functions and capabilities of the disk drives to which it is currently connected.

An important benefit of the disk array controller, in the preferred embodiment, is that it reduces or eliminates the need for system integrators to provide separate ATA and SCSI storage solutions. For example, the disk array controller may be provided as part of a disk array system/storage server that can be populated with SATA drives, SAS drives, or a combination thereof, without the need to change any other hardware components. This system may be provided with hot-swap drive carriers that accommodate both SATA and SAS disk drives, or alternatively, may be provided with separate hot-swap drive carriers for each of these drive types. In one embodiment, the system supports the hot swappability of SATA drives with SAS drives, and vice versa, allowing users to flexibly change from one drive type to the other over time.

Neither this summary nor the following detailed description is intended to define the invention. The invention is defined by the claims.

DETAILED DESCRIPTION OF ILLUSTRATIVE EMBODIMENTS

An example system that embodies the invention will now be described with reference to FIG. 1. As will be apparent, many of the implementation details of this example system may be varied or omitted without departing from the scope of the invention as defined by the claims. As used throughout the following description and the claims, the terms Serial ATA and Serial Attached SCSI, and their respective acronyms SATA and SAS, are intended to encompass all versions and releases of the associated specifications.

Figure 1:
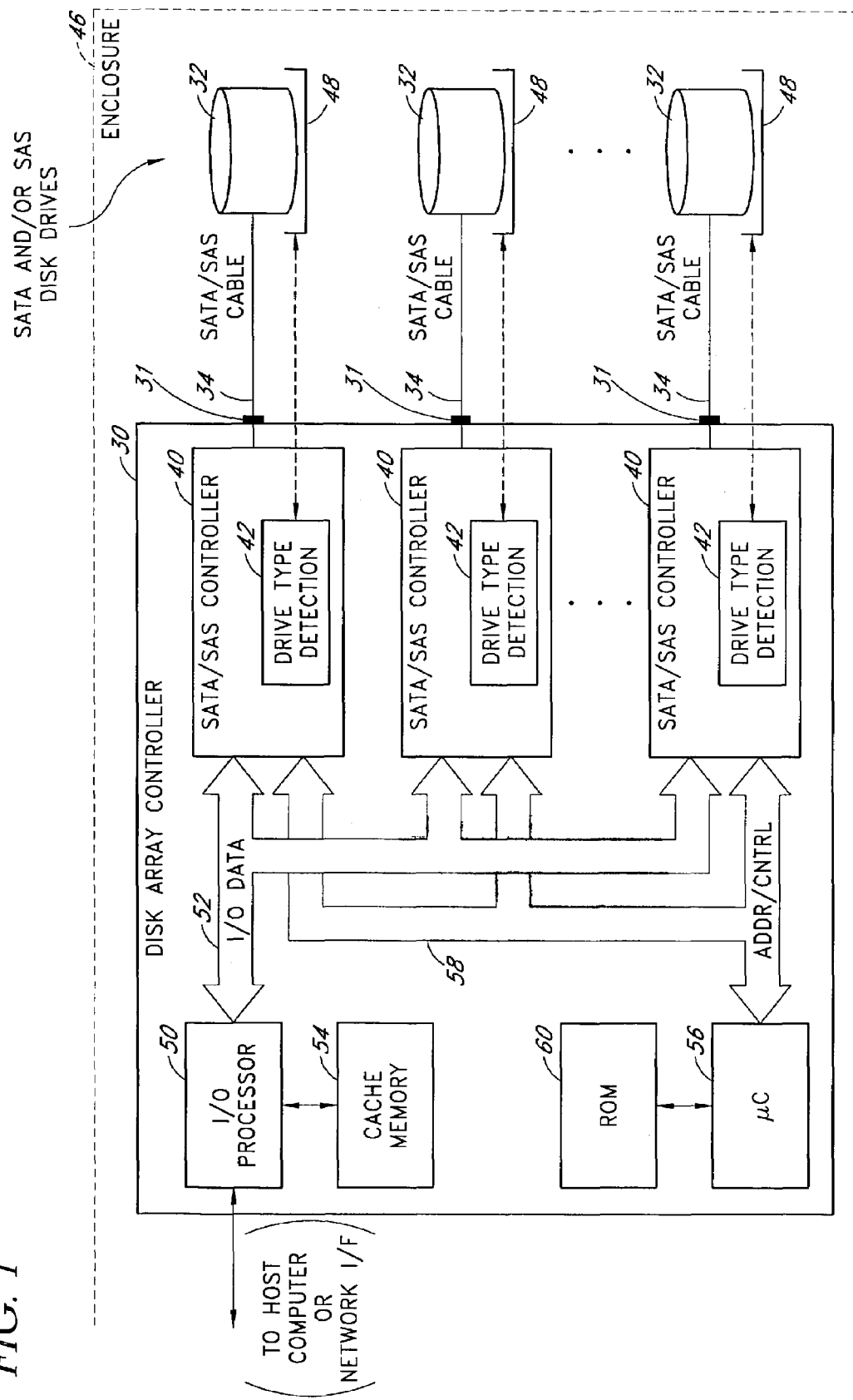
FIG. 1 illustrates a disk array system, including a disk array controller, according to one embodiment of the invention.

FIG. 1 illustrates a disk array system according to one embodiment of the invention. The system includes a disk array controller 30 that is connected to a plurality of disk drives 32 (three shown). Each disk drive 32 is preferably either a SAS disk drive or a SATA disk drive. In one embodiment, both types of drives may coexist within a given RAID (Redundant Array of Inexpensive Disks) or other disk array configuration. In another embodiment, only one of these two types of disk drives can be used at one time. Although the illustrated embodiment supports the SATA and SAS specifications, other disk drive interface standards may additionally or alternatively be supported.

Each disk drive 32 is connected to the disk array controller by a respective cable 34 or other connector. Because both SAS and SATA disk drives will use the same physical interface, the same type of cable 34 or other electrical connector may be used with both drive types. In the illustrated embodiment, each disk drive 32 is connected to and controlled by a respective controller 40 via a respective disk drive port 31 and cable 34. Each controller 40 includes logic for implementing both the host side of the ATA protocol and the host side of the SCSI (SAS) protocol. This logic may be implemented in automated circuitry, firmware, or a combination of both. Although some details of the SAS specification have not yet been finalized, the task of incorporating the SAS protocol into the controllers 40 will be well within the scope of those skilled in the art.

Each controller 40 also includes drive type detection logic 42 for automatically detecting the type of drive (SATA or SAS) currently connected to the corresponding port 31. This detection logic 42 may determine the drive type by communicating with the drive, or as described below, by detecting a particular attribute of the drive's carrier. Although separate drive type detection logic 42 is shown for each disk drive port 31, a single circuit or firmware program may be used to detect the types of all of the drives 32. The number of disk drive ports 31 and controllers 40 included on the disk array controller may, for example, be eight, twelve, or any other appropriate-number.

The disk array controller 30 is housed within an enclosure 46 that also houses the disk drives 32, although the disk drives 32 may alternatively be mounted in separate enclosure. The enclosure 46 may, for example, be the enclosure of a host PC or workstation for which the disk array controller 30 provides storage services. Alternatively, the enclosure 46 may be that of a dedicated storage server that provides virtualized storage services to many different host computers on a computer network, as disclosed in U.S. application Ser. No. 09/927,894, filed Aug. 10, 2001, the disclosure of which is hereby incorporated by reference. The disk array controller may present the disk drives 32 to the host computer or computers as a single SCSI drive.

Each disk drive 32 is preferably mounted within a respective hot-swap drive carrier 48 that slides into a corresponding bay or socket (not shown) of the enclosure 46. Well known hot swap carrier designs and circuitry may be used for this purpose. As depicted by the dashed arrows between the drive type detection logic 42 and the carriers 48, each drive carrier 48 may optionally include a drive indicator switch that may be tested or monitored by the drive type detection logic 42 to determine the type of drive present. This switch may be manually set to the correct position (SATA or SAS) at the time of drive insertion, or may alternatively be designed to automatically assume the proper position based on the physical configuration of the disk drive.

More preferably, however, the types of the disk drives 32 are determined by directly communicating each disk drive. This may be accomplished, for example, by initially attempting to communicate with a given disk drive 32 using one protocol (e.g., an ATA protocol), and if the disk drive does not respond properly, attempting to communicate with the disk drive using the other protocol (e.g., a SAS protocol). Yet another approach may be to measure the impedance, voltage levels, and/or other parameters on selected signal lines that interconnect the controller 40 and the disk drive 32.

The disk array system may support the ability for users to hot swap SATA disk drives with SAS disk drives, and vice versa. Administrators can thus replace disk drives without having to worry about the type (SATA or SAS) of the new disk drive. In one embodiment, the disk array controller 30 accepts the swapped-in disk drive 32 as long as its capacity equals or exceeds that of the disk drive being replaced.

In the illustrated embodiment, each SATA/SAS controller 40 communicates with an input/output (I/O) processor 50 via an I/O data bus 52. The I/O data bus 52 carries all I/O data that is read from or written to a disk drive 32. More specifically, data read from a disk drive 32 flows over the I/O bus 52 from the corresponding controller 40 to the I/O processor 50, and data being written to a disk drive flows over the I/O bus 52 from the I/O processor to the drive's controller 40. The I/O bus 52 may use a protocol that allocates timeslots to controllers 40 and drives 32 according to a least-recently-used or other arbitration scheme, as described in U.S. Pat. No. 6,134,630, the disclosure of which is hereby incorporated by reference. The I/O processor 50 accesses a cache memory 54 that is used to perform various types of I/O operations, as is conventional.

The controllers 40 also communicate with a microcontroller (μC) 56 via an address/control bus 58. The microcontroller 56 executes a firmware program that is stored in a non-volatile read-only memory (ROM) 60. This firmware program is responsible, among other things, for dividing host I/O operations into constituent disk drive commands according to the currently selected disk array configuration (e.g., RAID 0, RAID 4, RAID 5, etc.). The microcontroller 56 dispatches these disk drive commands over the address/control bus 58 to specific controllers 40 for execution by the corresponding disk drives. The microcontroller 56 may also read status information from each controller 40 to determine the type of drive (SAS or SATA) connected to each port 31, and may vary its operation accordingly. The types of the disk drives 32 may be reported or exposed by the disk array controller 30 to a host computer to facilitate remote administration of the disk array system.

The format of the disk drive commands passed over the address/control bus 58 to a particular controller 40 may optionally depend on the type of the corresponding disk drive 32. For example, the microcontroller 56 may send disk drive commands formatted according to the SATA specification to a controller 40 that controls a SATA drive 32, but may send disk drive commands formatted according to the SAS specification to a controller 40 that controls a SAS disk drive 32. Alternatively, the microcontroller 56 may dispatch similarly formatted commands to all controllers 40, and the controllers 40 may be responsible for appropriately translating such commands, as necessary, to the proper drive format.

Although separate buses 52, 58 are used in the illustrated embodiment for I/O data versus control information, a single, shared bus may alternatively be used to handle both types of transfers.

During an initialization phase (e.g., during boot-up or following a hot-swap event), each controller 40 in the illustrated embodiment is responsible for detecting whether it is connected to a SATA disk drive or an SAS disk drive (or possibly to no disk drive), and reporting this information to the microcontroller 56. Each controller 40 also enters into a mode in which it uses either an ATA protocol or a SCSI protocol to communicate with its disk drive 32, depending on whether the disk drive is a SATA drive or a SAS drive, respectively. Each controller 40 may also conform to the features and functions of the drive to which it is connected. For example, when a SAS drive 32 is connected, the controller may support block-level locking and other SCSI features that are not currently supported by SATA drives. In addition, full duplex operation (i.e., concurrent bi-directional communications with the disk drive) may be used when a SAS drive is connected, while half-duplex operation (i.e., data flow in only one direction at a time) may be used when a SATA drive is connected.

Once the disk array controller determines the types of all of the disk drives 32, it may optionally select an I/O bus protocol (for the I/O bus 52) that is best suited for the particular set of drives. For example, when only SATA drives are connected, an I/O bus protocol that is optimized for SATA drives may be used; and when only SAS drives are present, an I/O bus protocol that is optimized for SAS drives may be used. Yet another I/O bus protocol may be used when a mix of SATA and SAS drives exists. Rather than selecting between different protocols, the disk array controller 30 may vary one or more parameters, such as timeslot length, of a protocol that accommodates both types of disk drives. The functionality for selecting between I/O bus protocols and/or varying protocol parameters may, for example, be embodied within the firmware program executed by the microcontroller 56.

An important benefit of the disk array controller 30, in the preferred embodiment, is that it reduces or eliminates the need for system integrators to develop and support separate ATA and SCSI storage solutions. For example, the disk array controller 30 may be incorporated into a storage server/enclosure that may be populated with either SAS or SATA drives (or both), without the need to change any other hardware or software components. A storage integrator may populate each such storage server as needed to sell SCSI storage solutions and ATA storage solutions. In addition, purchasers of such systems can change from one drive type to the other over time, if desired.

Figure 2:
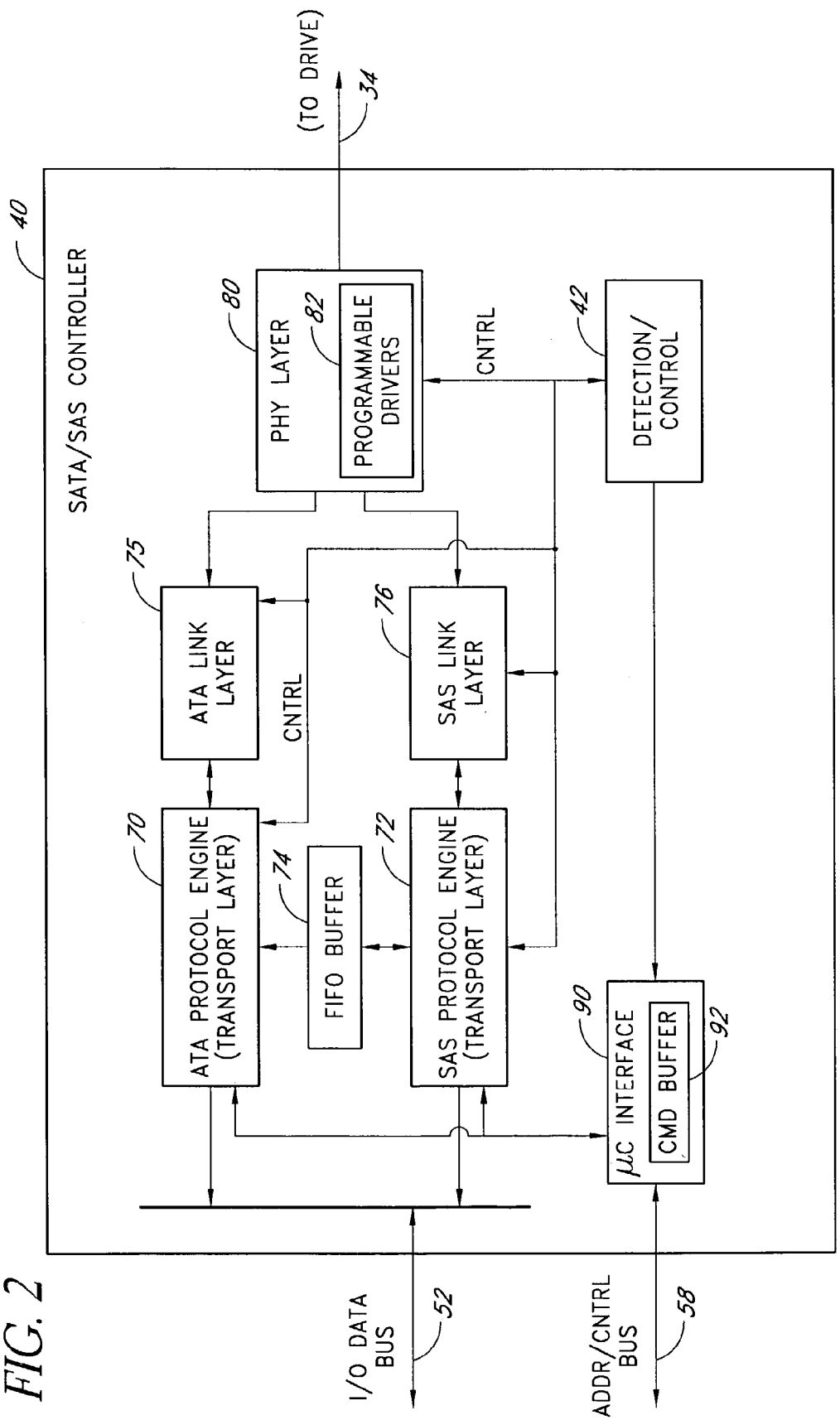
FIG. 2 is a block diagram of one of the SATA/SAS controllers of FIG. 1.

FIG. 2 illustrates one possible design of the SATA/SAS controllers 40 of FIG. 1. The controller 40 includes an ATA protocol engine 70 that implements the host side of an ATA protocol, and includes a SCSI/SAS protocol engine 72 that implements the host side of a SCSI/SAS protocol. Each controller is thus capable of communicating with ATA and SCSI disk drives using the native protocols of these drives, without the need for protocol tunneling. Both protocol engines 70, 72 are coupled to the I/O data bus 52, and may include or share bus arbitration logic for communicating thereon. The ATA and SCSI/SAS protocol engines 70, 72 are connected to an ATA link layer module 75 and a SAS link layer module 76, respectively. The ATA and SAS protocol engines 70, 72 and link layer modules 75, 76 may optionally be implemented purely in automated, application-specific circuitry, without the use of firmware. Alternatively, certain functions of these components 70, 72, 75 and 76 may be implemented in firmware.

Each link layer module 75, 76 is connected to a common physical (PHY) layer circuit 80 that generates and receives electrical signals on the cable or other connector 34. As illustrated, the physical layer circuit 80 may optionally include programmable drivers 82 that can be controlled to accommodate differences between the SATA and SAS specifications, such the different maximum cable lengths (currently 1 meter for SATA and 10 meters for SAS). These drivers 82 may be controlled so as to adjust the slew rate, current drive, impedance, and/or other parameters for communicating on the cable 34, depending upon whether the controller 40 is currently connected to a SATA disk drive versus a SAS disk drive.

The controller 40 also includes a shared FIFO (first-in-first-out) buffer 74 that is used by the currently-selected protocol engine 70 or 72 to temporarily store I/O read and write data. The FIFO buffer 74 may optionally be divided into separate read and write FIFO buffers, and may be configured differently depending upon whether the controller 40 is currently controlling a SATA drive versus a SAS drive. In one embodiment, for example, the FIFO buffer 74 is subdivided into separate read and write FIFO buffers when the controller 40 is operating in SAS mode (to accommodate full duplex operation), and is maintained as a single read/write FIFO buffer when the controller is operating in SATA mode.

The controller 40 also includes a detection/control circuit 42 that is responsible for detecting the type of the corresponding disk drive 32, and for maintaining the controller in the appropriate mode (SATA or SAS) when the drive type in known. In one embodiment, this circuit 42 controls the ATA and SAS protocol engines 70, 72 during an initialization phase to cause the controller to initially try communicating with the disk drive using one protocol (SATA or SATA), and to then try the other protocol if the initial attempt is unsuccessful. The controller 40 may also read identifying information from the disk drive, such as the drive's IDENT string, to determine or confirm the type of the drive. Once the type of the drive is known, detection/control circuit 42 selects the corresponding protocol engine 70 or 72 and link layer 75 or 76 for use, and configures the programmable drivers 82 accordingly.

The controller 40 also includes a common microcontroller interface 90 for communicating with the microcontroller 56 (FIG. 1). This microcontroller interface preferably includes a command buffer 92 that buffers commands received from the microcontroller 56. Disk drive commands are dispatched from this command buffer to the currently selected protocol engine 70 or 72 for execution.

Although this invention has been described in terms of certain preferred embodiments, other embodiments that are apparent to those of ordinary skill in the art, including embodiments that do not provide all of the features and benefits described herein, are also within the scope of this invention. Accordingly, the scope of the present invention is defined only by the appended claims.

What is claimed is:

1. A disk array controller, comprising:
   a plurality of ports for connecting a plurality of disk drives;
   detection logic for detecting a type of each such disk drive, wherein the detection logic is capable of distinguishing between an Advanced Technology Attachment (ATA) disk drive and a Small Computer System Interface (SCSI) disk drive; and
   a plurality of controllers for controlling the plurality of disk drives, each controller comprising an ATA protocol engine and a SCSI protocol engine such that each controller can control an ATA disk drive or a SCSI disk drive.

2. The disk array controller according to claim 1, wherein each controller comprises an ATA protocol engine and a SCSI protocol engine that use a common FIFO buffer to store I/O data.

3. The disk array controller according to claim 1, wherein the ATA protocol engine implements a Serial ATA (SATA) protocol, and the SCSI protocol engine implements a Serial Attached SCSI (SATA) protocol.

4. The disk array controller according to claim 3, wherein the disk array controller further comprises programmable drivers that vary the signal transmission characteristics of signals transmitted to the disk drives to accommodate differences between SATA and SAS disk drives.

5. The disk array controller according to claim 1, further comprising a processor that executes a firmware program, said firmware program embodying at least one RAID (Redundant Array of Inexpensive Disks) algorithm such that the disk array controller is capable of controlling the plurality of disk drives as a RAID array.

6. The disk array controller according to claim 5, wherein the firmware program and the controllers are capable of operating the plurality of disk drives as a RAID array that includes both ATA and SCSI disk drives.

7. The disk array controller according to claim 1, wherein the detection logic detects the types of the disk drives by communicating with the disk drives.

8. The disk array controller according to claim 1, wherein the detection logic comprises circuitry that causes each controller to attempt to communicate with a corresponding disk drive using each of an ATA protocol and a SCSI protocol.

9. The disk array controller according to claim 1, wherein the detection logic detects the types of the disk drives by detecting attributes of corresponding hot swap drive carriers.

10. The disk array controller according to claim 1, in combination with said plurality of disk drives.

11. The disk array controller according to claim 10, wherein the plurality of disk drives includes at least one Serial ATA disk drive and at least one Serial Attached SCSI disk drive, and the disk array controller is configured to operate the plurality of disk drives as a RAID (redundant array of inexpensive disks) array.

12. The disk array controller according to claim 1, wherein the disk array controller further comprises an input/output (I/O) processor that communicates with the plurality of controllers over an I/O data bus, and wherein the disk array controller varies a protocol used on the I/O data bus depending upon types of disk drives detected by the detection logic.

13. A disk array system, comprising:
    a plurality of hot swap drive carriers, each of which houses a Serial Advanced Technology Attachment (SATA) disk drive or a Serial Attached Small Computer System Interface (SAS) disk drive; and
    disk array controller that controls the plurality of disk drives to provide storage for at least one host computer, the disk array controller comprising a plurality of controllers, each of which controls a respective one of the disk drives, each controller including an ATA protocol engine and a SCSI protocol engine;
    wherein the disk array controller is configured to detect whether each disk drive is a SATA disk drive or an SAS disk drive, and to select a corresponding protocol with which to communicate with that disk drive.

14. The disk array system according to claim 13, wherein the disk array controller determines whether each disk drive is a SATA disk drive or a SAS disk drive by communicating with the disk drives.

15. The disk array system according to claim 13, wherein the disk array controller determines whether each disk drive is a SATA disk drive or a SAS disk drive by detecting positions of drive type indicator switches of the hot swap drive carriers.

16. The disk array system according to claim 13, wherein the disk array controller is configured to operate the plurality of disk drives as a redundant array of inexpensive disks (RAID).

17. The disk array system according to claim 16, wherein the plurality of disk drives includes at least one SATA disk drive and at least one SAS disk drive.

18. The disk array system according to claim 13, wherein each hot swap drive carrier is configured to accommodate both SATA and SAS disk drives.

19. The disk array system according to claim 13, wherein each controller further includes a first-in-first-out (FIFO) buffer that is shared by that controller's ATA and SCSI protocol engines.

20. The disk array system according to claim 13, wherein each controller further includes detection logic for detecting a type of a disk drive to which the controller is connected.

21. The disk array system according to claim 13, wherein the disk array controller supports the hot swappability of SAS disk drives with SATA disk drives.

* * * * *